(12) United States Patent
Chalons et al.

(10) Patent No.: US 11,952,098 B2
(45) Date of Patent: Apr. 9, 2024

(54) INTERCHANGEABLE DOOR SILL PROTECTION SYSTEM AND ASSOCIATED INSTALLATION METHOD

(71) Applicant: Airbus Operations SAS, Toulouse (FR)

(72) Inventors: Christophe Chalons, Toulouse (FR); Laurent Talou, Toulouse (FR); Sylvain Peyraud, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 58 days.

(21) Appl. No.: 17/534,046

(22) Filed: Nov. 23, 2021

(65) Prior Publication Data
US 2022/0161917 A1    May 26, 2022

(30) Foreign Application Priority Data

Nov. 26, 2020   (FR) ...................................... 2012195

(51) Int. Cl.
    B64C 1/14         (2006.01)
(52) U.S. Cl.
    CPC .................................. B64C 1/1461 (2013.01)
(58) Field of Classification Search
    CPC ........ B64C 1/1461; B64C 1/18; B64C 1/1407
    See application file for complete search history.

(56) References Cited

U.S. PATENT DOCUMENTS

| X837474 | 12/1906 | Jewell et al. |
| 5,243,786 A | 9/1993 | Lubensky et al. |
| 7,266,929 B1 * | 9/2007 | Allred ....................... E06B 1/70 52/214 |
| D758,612 S * | 6/2016 | Skaar ......................... D25/48.2 |
| D774,660 S * | 12/2016 | Skaar ......................... D25/48.2 |
| 2006/0096190 A1* | 5/2006 | Baczuk ...................... E06B 1/70 52/204.1 |
| 2006/0220415 A1 | 10/2006 | Carrier |
| 2010/0193633 A1 | 8/2010 | Budinger et al. |

(Continued)

FOREIGN PATENT DOCUMENTS

| EP | 1623878 A1 | 2/2006 |
| GB | 2424614 A | 10/2006 |

OTHER PUBLICATIONS

French Search Report; priority document.

*Primary Examiner* — Joshua J Michener
*Assistant Examiner* — Cindi M Curry
(74) *Attorney, Agent, or Firm* — Greer, Burns & Crain, Ltd.

(57) ABSTRACT

A system for protection of at least one aircraft door sill, including a rigid panel having shape and dimensions configured to cover and to protect the sill at least partially having an attachment face oriented toward the sill of the aircraft and configured to come to rest on the latter and a step face oriented in the direction away from the attachment face. The panel includes, on one transverse side, at least one cavity forming a housing and, on the other side, an arrangement for removably fixing to the sill. The protection system equally includes at least one bar having a shape at least partially complementary to the cavity to assure the nesting thereof. In this way the panel protects the sill and can easily be replaced: the sill is provided with a rapidly interchangeable protection system.

12 Claims, 9 Drawing Sheets

(56) References Cited

U.S. PATENT DOCUMENTS

2013/0199101 A1* 8/2013 Rager-Frey .............. E06B 1/70
                                                                       49/469
2019/0178027 A1* 6/2019 Tangudu ................ E06B 9/02

* cited by examiner

… (US 11,952,098 B2)

INTERCHANGEABLE DOOR SILL PROTECTION SYSTEM AND ASSOCIATED INSTALLATION METHOD

CROSS-REFERENCES TO RELATED APPLICATIONS

This application claims the benefit of the French patent application No. 2012195 filed on Nov. 26, 2020, the entire disclosures of which are incorporated herein by way of reference.

The present invention concerns a protection system for a door sill of an aircraft. The present invention equally concerns the method for installation of that system.

BACKGROUND OF THE INVENTION

The door sill is one of the areas of an aircraft most thronged by any type of person whether that be, for example, passengers during boarding/disembarkation or operatives during manufacture, testing or maintenance of the aircraft. There follows from this, possible deterioration over time. By way of illustration, the door sill may be damaged by an impact such as a dropped tool, for example; certain metal parts may deteriorate through corrosion because of the infiltration of water coming from the outside or even from the inside such as condensation: in most current aircraft, intervention is complicated because the zone to be repaired at the level of the sill forms an integral part of the floor. Moreover, as this is a passageway, it is very often used and the time intervals during which it is possible to intervene are short.

SUMMARY OF THE INVENTION

An object of the present invention is to propose an interchangeable protection system for the door sill and a method for installation of that system enabling it to be replaced rapidly and easily.

To this end, the present invention concerns an aircraft comprising a system for protection of at least one door sill, the system comprising a rigid panel with shape and dimensions adapted to cover and to protect the sill at least partially, having an attachment face oriented toward the sill of the aircraft and intended to come to rest on the latter and a step face oriented in the direction away from the attachment face, the panel comprising on one transverse side at least one cavity forming a housing and on the other side means for removable fixing to the sill, and in that the system equally comprises at least one bar having a shape at least partially complementary to the cavity in order to assure the nesting thereof.

In this way the panel protects the door sill and can easily be replaced: the sill is provided with a rapidly interchangeable protection system.

The invention provides at least one of the following optional features, separately or in combination.

The cavity includes a groove into which comes to be inserted a tongue provided on the bar.

The bar has an external wall forming an abutment against an internal wall of the cavity to immobilize the panel in movement in translation relative to the sill.

The device for fixing the system to the sill comprises at least one screw inserted in and screwed into at least one threaded through-opening provided in the panel.

The bar or bars comprise(s) at least one threaded orifice to enable fixing thereof by screwing to the door sill.

The bar(s) is or are screwed to the sill using existing fixing holes.

The panel comprises drainage holes.

The step face has at least one sloping surface leading to at least one hole or to at least one gutter passing through it in a continuous or discontinuous manner.

The panel covers at least partly the drainage panel of the sill and is substituted for the sill bar.

The step face is at least partially non-skid.

The step face of the panel has a distinctive marking.

The present invention equally concerns a method for installation of a protection system in an aircraft having at least one of the above optional features, characterized in that it comprises the following steps: —fixing the bar or bars to the door sill; —deposition of the panel on the sill with the bar or bars inserted in the corresponding cavity or cavities; —fixing the panel to the sill with the aid of the removable fixing means.

BRIEF DESCRIPTION OF THE DRAWINGS

Other objects, features and advantages will emerge from the following description of the invention given by way of nonlimiting example only with reference to the appended drawings, in which.

DETAILED DESCRIPTION OF THE PREFERRED EMBODIMENTS

Figure 1:
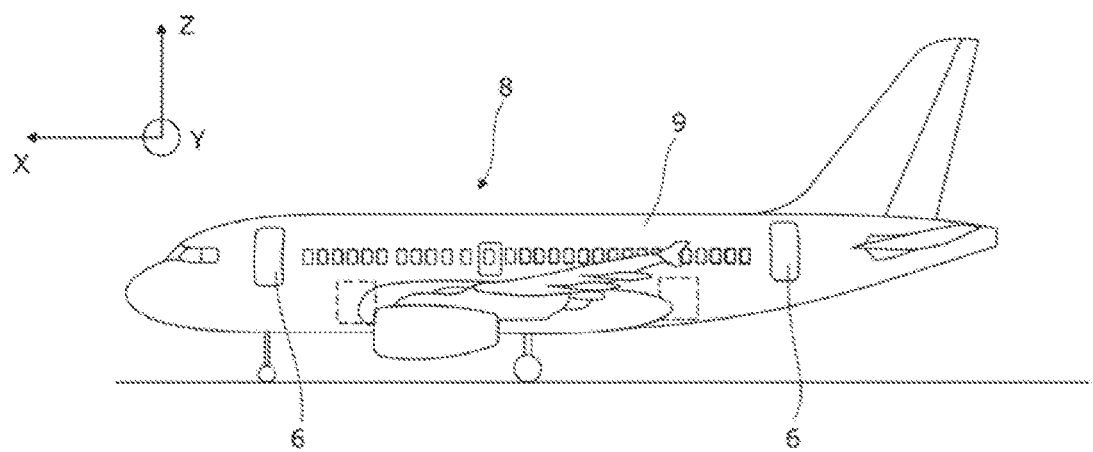
FIG. 1 is a simplified side view of an aircraft in which a protection system in accordance with the present invention can be installed.
Figure 2:
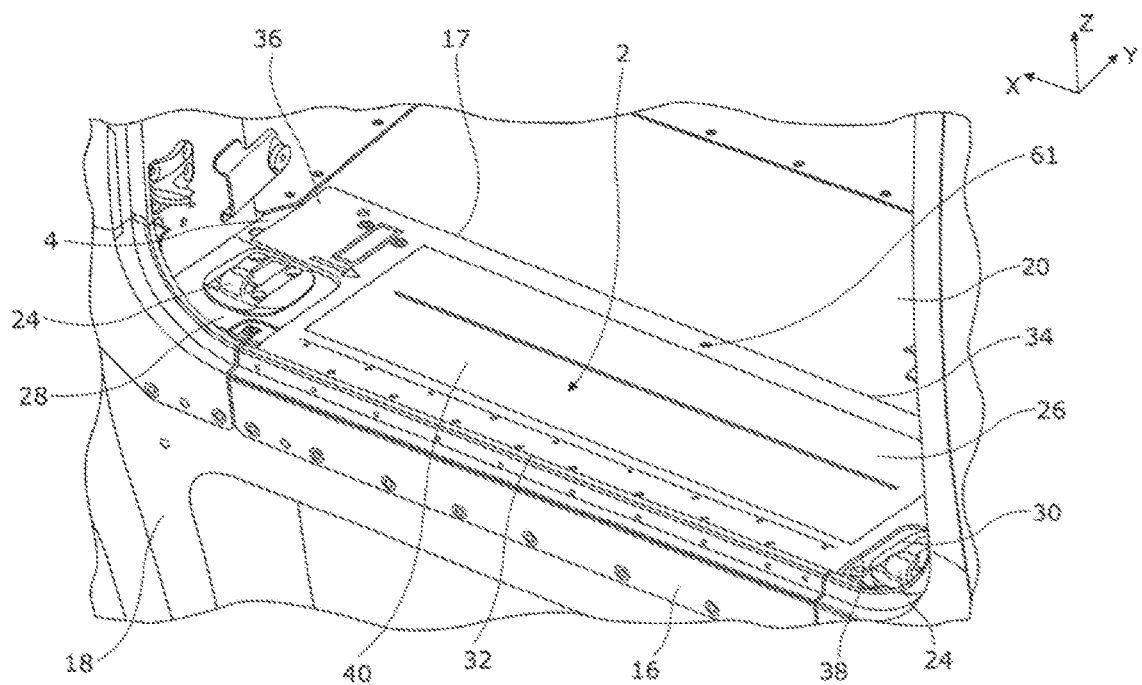
FIG. 2 is a perspective view of a protection system in accordance with the present invention installed on an aircraft door sill.

As represented in FIGS. 1 and 2, the present invention relates to a protection system 2 of a sill 4 of door 6 of an aircraft 8. The following description refers for convenience to an orthonormal system of axes X, Y, Z in which the horizontal directions X, Y and the vertical direction Z are defined with reference to an aircraft placed on horizontal ground. The same applies where the use of the terms "horizontal", "vertical", "upper", "lower", "top", "bottom" is concerned, considered with reference to this system of axes throughout this description. The direction X is defined as being the longitudinal direction of the fuselage 9 of the aircraft and the direction Y as being a transverse direction. Qualification as longitudinal, respectively transverse, means parallel to the longitudinal direction, respectively transverse direction. The interior refers to everything that is found inside the fuselage 9 of the aircraft and the exterior to everything that is found outside the fuselage. When reference is made to an interior edge, respectively an exterior edge, of an element, this means the edge farthest from, respectively closest to, the environment external to the aircraft. The terms front and rear are considered relative to the direction of movement of the aircraft in flight.

Figure 3:
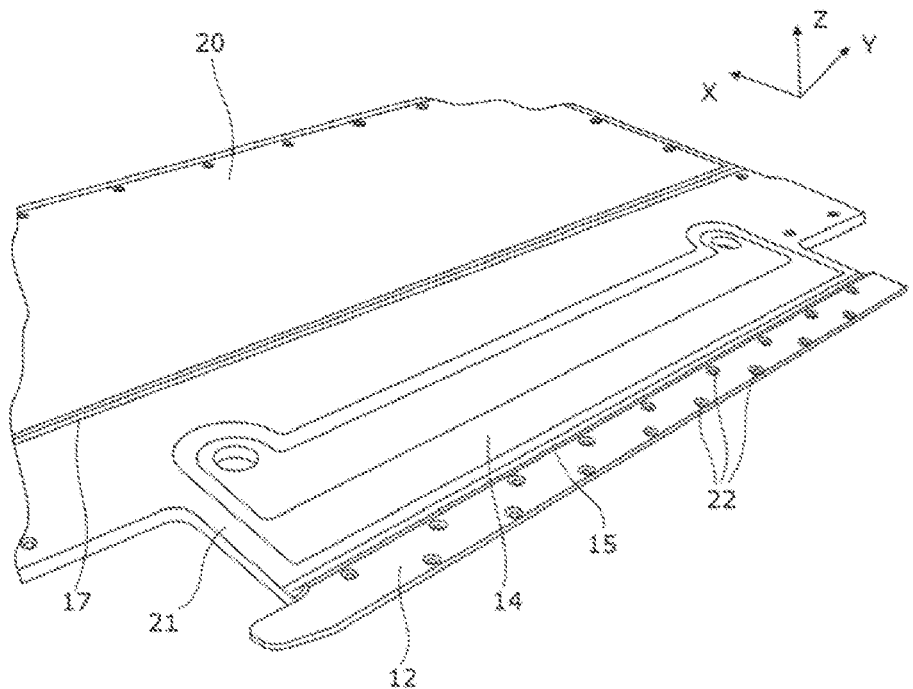
FIG. 3 is a schematic simplified perspective view of a door sill.
Figure 4:
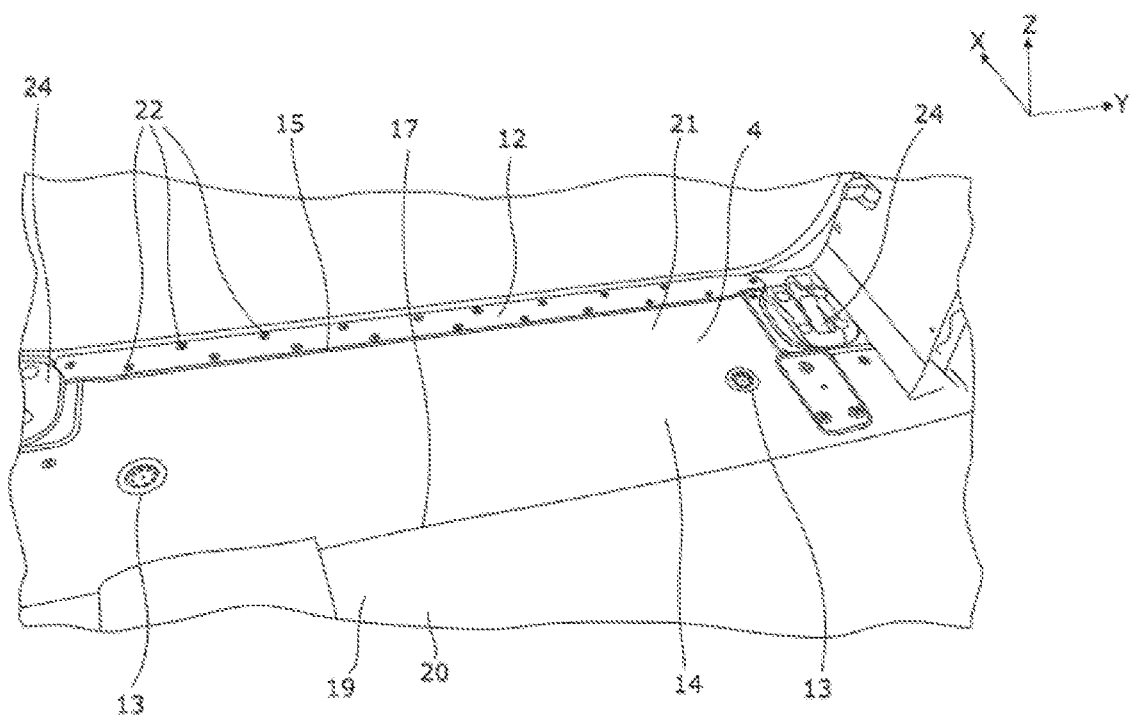
FIG. 4 is a simplified perspective view from the inside of an aircraft door sill.
Figure 5:
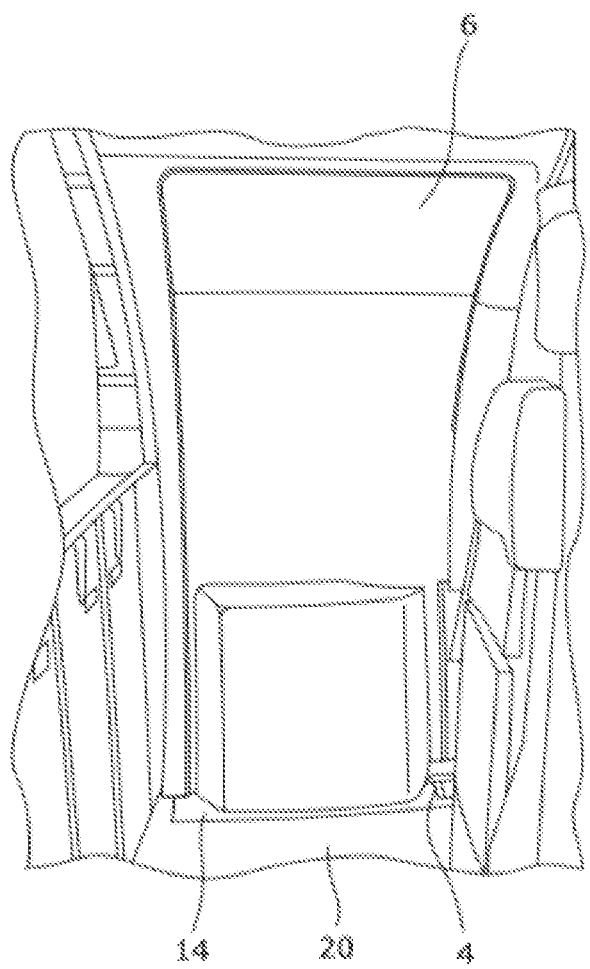
FIG. 5 is a simplified perspective view from the inside of an aircraft of an example of a door.
Figure 6:
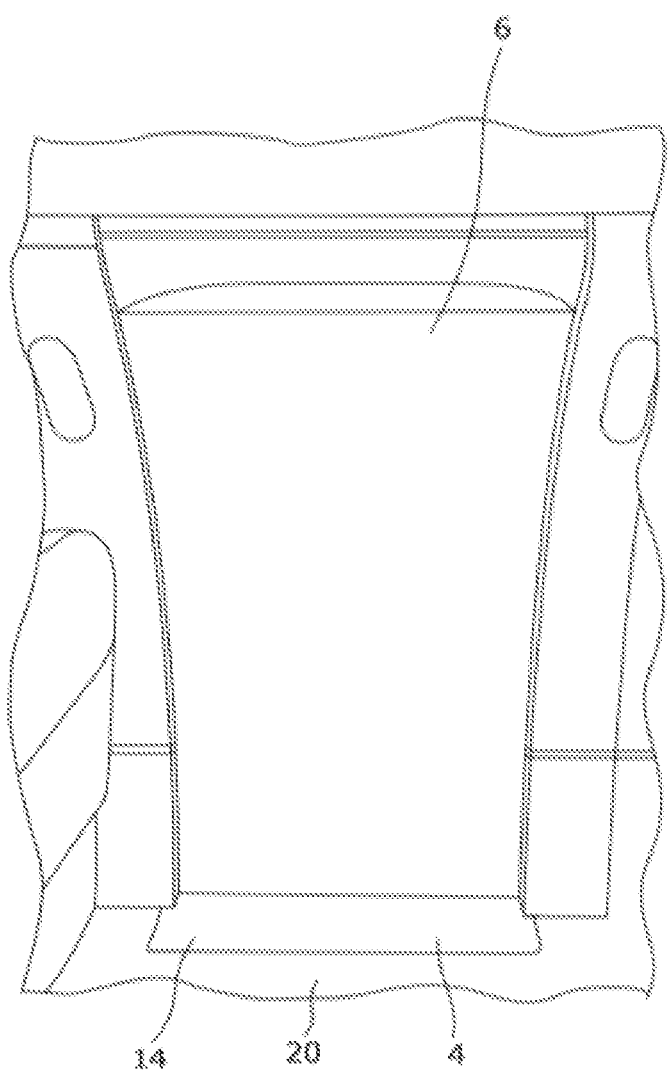
FIG. 6 is a simplified perspective view from the inside of an aircraft of another example of a door the sill of which is slightly different.

As illustrated in FIG. 1, the aircraft 8 comprises a plurality of doors 6 enabling access to the interior thereof in the body of the fuselage 9. In a commercial aircraft, for example, the doors 6 generally lead for the most part into the passenger cabin. The sill 4 in the example illustrated in FIGS. 3 and 4 is the zone delimited by a conventional sill bar 12 and the panel 14 providing drainage adjacent to the bar 12, known as the drainage panel 14. The sill bar 12 forms the connection with the plate 16 protecting the exterior surface 18 of the skin of the fuselage 9 against scratches, scrapes and any other kind of damage. The drainage panel 14 assures drainage of recovered water by guiding it to an outlet, which in the form illustrated in FIG. 4 takes the form of two plugholes 13. The plate 16 covers the surface 18 of the fuselage located below the door 6 or even on either lateral side of and below the latter. Inside the aircraft the sill bar 12 is juxtaposed to the drainage panel 14. The drainage panel 14 extends at least partially in line with the door 6 from the interior longitudinal edge 15 of the sill bar 12 to the exterior longitudinal edge 17 of the cabin floor zone having a carpet or other type covering 19, referred to hereinafter as the covered floor 20 to distinguish it from the floor 21 considered as a whole, namely comprising in particular the door sill. As FIGS. 5 and 6 show, depending on the aircraft, the panel 14 projects more or less beyond the door 6 inside the aircraft, here in the cabin. As illustrated in FIG. 4, the sill bar 12 is fixed to the structure of the aircraft by a row of screws 22. The sill 4 forms a part of the floor 21 over which passengers, operatives and others walk to enter or to leave the aircraft. The door sill 4 equally comprises two brackets 24 for arming the evacuation slide integrated into the floor 21 in line with each of the lateral bottom corners of the door 6.

Figure 7:
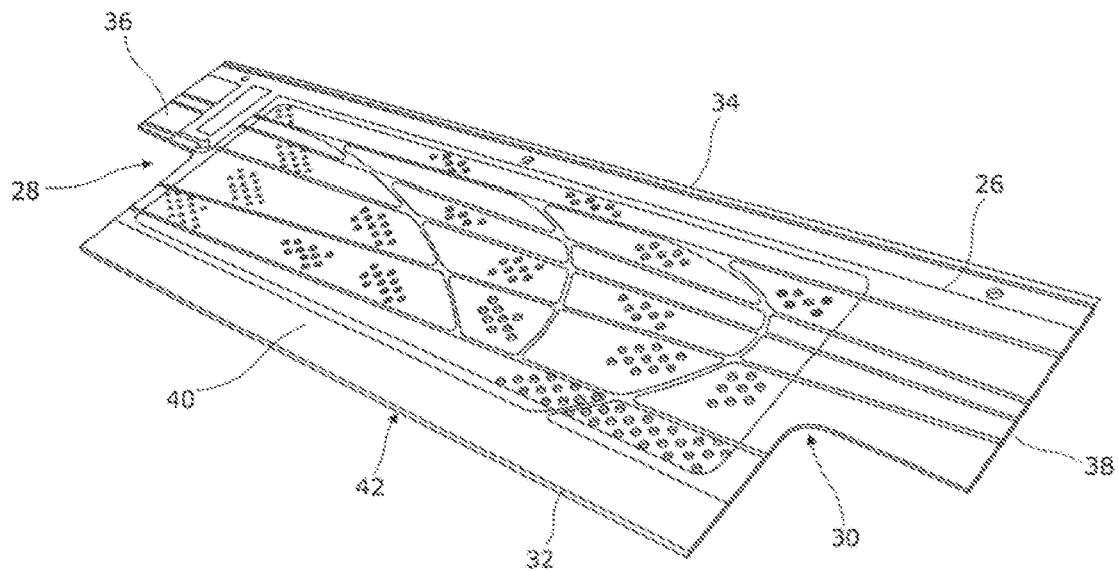
FIG. 7 is a perspective view of a panel of the protection system represented on its own.

The protection system 2 for the door sill comprises a panel 26 of a size adapted to cover and to protect the door sill 4 at least partially; FIG. 7 represents an example of a panel represented on its own, independently of the environment into which it is integrated. The panel 26 has a stiffness such that it is not deformed during its manipulation to fit it onto the sill or to remove it, thus facilitating its use. It is constituted of at least one rigid material, such as a metal, a composite material or other material. The shape and the dimensions of the protection panel 26 depend on the structure of the sill 4 of the aircraft in question as discussed above with reference to the aircraft examples from FIGS. 5 and 6. In the example illustrated the panel 26 has, when seen from above, a rectangular shape two corners 28, 30 of which have been cut away for the arming brackets 24 of the evacuation slide to pass through. In the example illustrated, each cutaway corner 28, 30 has, when seen from above, a substantially square shape but could have any other type of shape. The panel 26 as represented in FIG. 7 therefore has the overall shape of a T. To be more precise, it covers the zone covered by the conventional sill bar 12 for which it is substituted, at least partially the drainage panel 14 and even, in some configurations, part of the covered floor 20. In the form illustrated in FIG. 2, the panel 26 covers the zone covered by the sill bar 12 that it replaces and the drainage panel 14 so as to become contiguously juxtaposed to the exterior longitudinal edge 17 of the covered floor 20.

As illustrated in FIGS. 2 and 7, the panel 26 has four edges 32, 34, 36, 38: an exterior longitudinal edge 32, an interior longitudinal edge 34, a front transverse edge 36 and a rear transverse edge 38. The edges 32, 34 are qualified as longitudinal because once the panel has been fixed to the sill 4 they lie in the direction of the plane of the door that is virtually parallel as shown in FIG. 1 to the longitudinal direction of the aircraft. The longitudinal edges 32, 34 are in most cases the longest edges, but this is not necessarily so. The front, rear transverse edges 36, 38 are perpendicular to the longitudinal edges 32, 34. The panel 26 has two faces 40, 42: a step face 40 oriented upward, toward the free space in which persons are able to move, namely here in the case of a commercial aircraft toward the cabin. The other face 42, known as the attachment face, opposite the step face, is oriented downward, toward the floor 21, to rest on the door sill 4.

Figure 8:
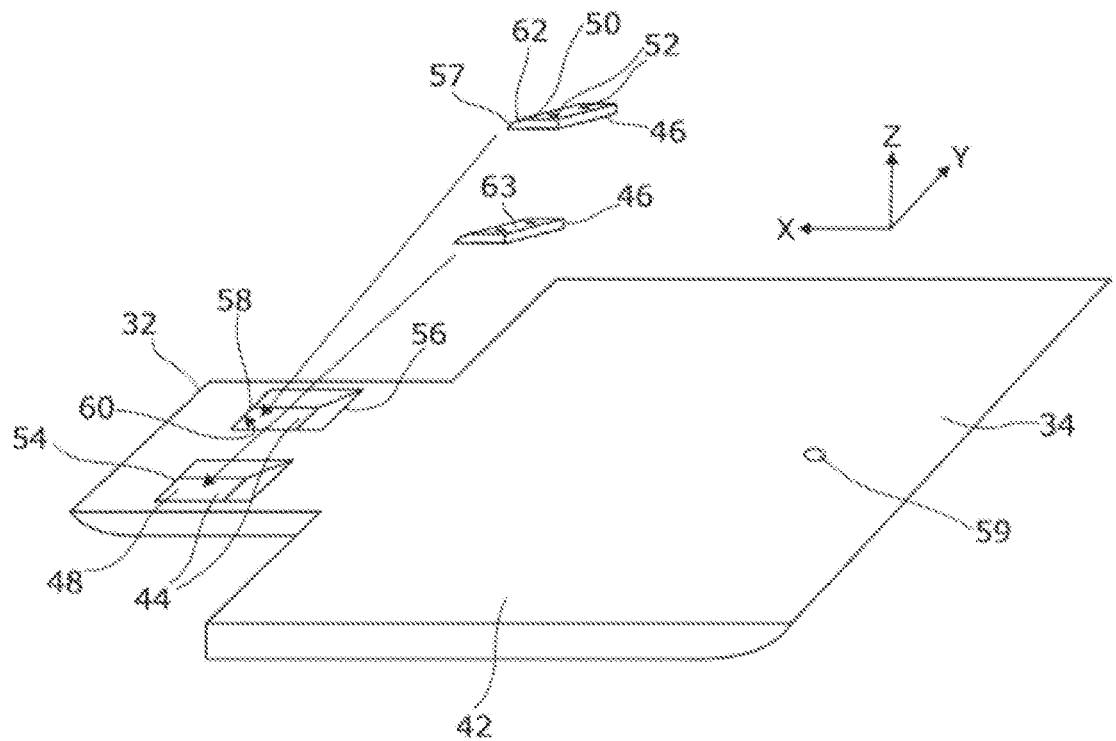
FIG. 8 is a schematic and simplified perspective view of one embodiment of a protection system in accordance with the present invention comprising a panel and two bars.
Figure 9:
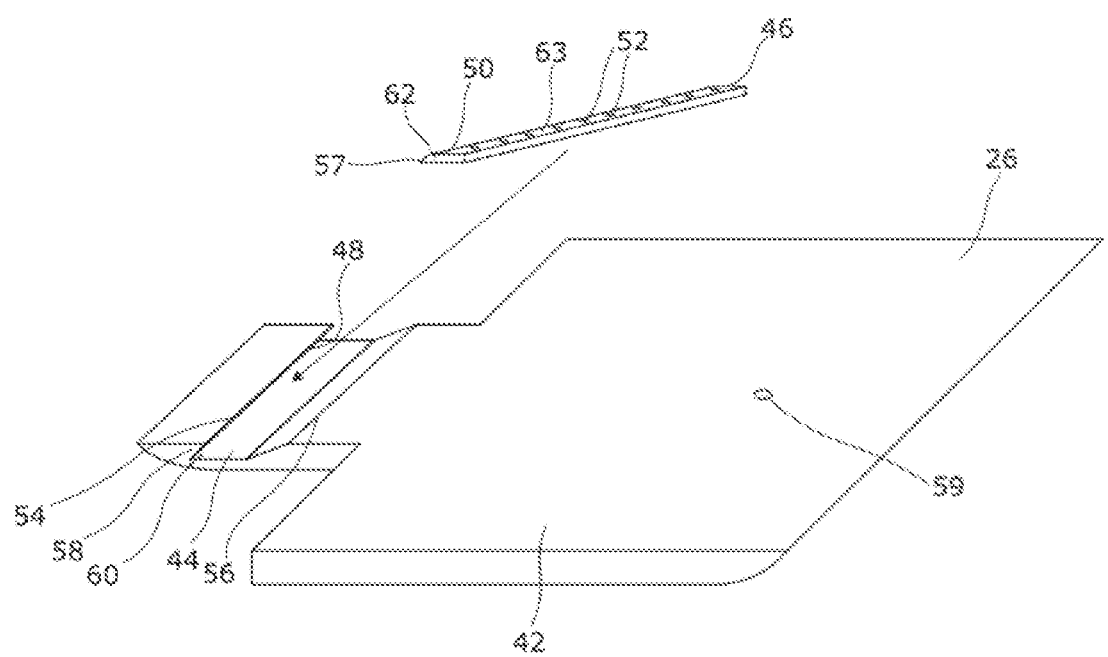
FIG. 9 is a schematic and simplified perspective view of another embodiment of a protection system in accordance with the present invention comprising a panel and one bar.

As FIGS. 8 and 9 show, if the panel is notionally divided in two transversely, the panel 26 has on one side, the so-called exterior side once the panel is installed, at least one cavity 44 forming a housing. The blind cavity 44 opens into the attachment face 42. In the embodiment illustrated, when the panel is installed on the sill 4, the cavity is located in the vicinity of the exterior longitudinal edge 32 intended to come into line with the door 6 as close as possible to the exterior of the aircraft. The protection system 2 comprises at least one bar 46 the exterior shape of which corresponds at least partially to the interior shape of the cavity 44. The bar 46 is a block comprising at least one rigid material such as metal, composite material or other material intended to come to form an abutment against an internal wall 48 of the cavity 44. It may comprise a material identical to that used for the panel or partially or completely different. The cavity 44 has an internal wall 48 the shape of which is at least partially complementary to that of the external wall 50 of the bar 46 in order to assure nesting thereof. Each bar 46 is configured to be fixed to the door sill 4 by any type of means.

In the form illustrated, the bar 46 has at least one, in this instance two, threaded through-orifices 52 the thread of which corresponds to that of the screws 22. To modify the existing structure of the aircraft as little as possible to enable installation of the system 2, the threaded holes made for the screws 22 for fixing the sill bar 12 are used to fix the bar or bars 46. The sill bar 12 will be removed to be replaced by a part of the panel 26. Once fixed to the door sill 4 and inserted in the cavity 44 of the panel 26, the bar 46 enables an abutment in translation to be provided. Sliding movement of the panel 26 parallel to the floor 21 is stopped by the abutments that the bar or bars 46 form(s). The cavities 44 and the bars 46 may have any type of shape and be in sufficient numbers to address two imperatives: —the bar or bars 46 must form an abutment in translation of the panel 26 parallel to the sill 4, the movement of the wall 48 inside the cavity 44 being stopped by the external wall 50 of the corresponding bar; —the bar 46 must be easily insertable in the cavity 44 merely by placing the panel 26 on the door sill 4. This imperative may be relaxed for slightly more complex and more time-consuming installation. Fixing by clipping or other means may be provided for example, less simple but equally effective.

Returning to the notional separation in two transversely of the panel mentioned hereinabove, the panel 26 has on the other side, known as the interior side, a device for removably fixing the panel to the structure of the aircraft and here, more particularly, to the panel 14 or to the covered floor 20 according to the configuration and the choices made. Here removable means that the panel can be removed from the structure of the aircraft without damaging it. The removable fixing may be achieved in various ways, for example by means of double-sided adhesive tape, by a hook and loop type, e.g., Velcro (registered trademark) type system, by clipping, etc. In the form illustrated, the fixing is effected by screwing. At least one threaded through-opening 59 is provided for this purpose in the vicinity of the interior longitudinal edge 34. In the case of a plurality of cavities 44 and/or through openings 59, the latter are preferably respectively aligned with a longitudinal axis, the line of the cavities 44 being parallel to that of the openings 59. A screw 61 is introduced into each opening 59 (into the opening 59 if there is only one of them) to fix the panel to the sill 4, which is immobilized in translation by the bar 46.

The thickness of the panel 26 is such that the panel can be placed on the sill 4 partially under the door 6 by exploiting some of the clearance provided while securing all the drainage mechanisms or those of the evacuation slide. Openings may be provided in the panel to reduce the weight thereof while leaving it sufficiently solid to remain functional.

In the form illustrated in FIG. 8, the panel 26 comprises two cavities 44 and two bars 46. In the embodiment illustrated in FIG. 9 the panel 26 comprises a single longitudinal cavity 44 and a single longitudinal bar 46 of the same length. In the form illustrated, the length of the cavity and of the bar corresponds to the longitudinal length of the panel: the cavity 44 passes through the panel 26 longitudinally and opens from two transverse sides 36, 38. Once installed in the cavity 44 the bar 46 extends longitudinally over all the length of the panel. In this embodiment with a single cavity and longitudinal bar, the bar 46 has at least two orifices 52 for the passage of the fixing screws 22 and more than two of them in the example illustrated.

As seen above, the cavity 44 and the associated bar 46, namely the bar 46 intended to be inserted into the corresponding cavity, have an at least partially identical contour (FIGS. 8 and 9) but could have a different shape provided that they satisfy the abovementioned two imperatives. In the embodiments illustrated in FIGS. 8 and 9, the cavity 44 has an exterior longitudinal edge 54 and an interior longitudinal edge 56 parallel to one another located at the level of the attachment face 42. The exterior edge 54 forms a return 58 toward the interior of the cavity 44. The return 58 enables formation inside the cavity of a groove or channel 60. On its exterior longitudinal upper edge 57 intended to be located as close as possible to the longitudinal edge 32 of the panel once installed inside the cavity the bar 46 has a tongue 62 of complementary shape to the groove 60 formed by the return 58 of the cavity 44. When the panel 26 is placed on the bar or bars 46, the tongue 62 of the/each bar 46 therefore comes to be inserted in the/each groove 60 of the/each cavity of the panel. As will be seen hereinafter, because of the existence of a return 58 at the level of the cavity, the insertion of the bar in the cavity is found to be blocked if a vertical movement is performed to place the bar in the cavity. The panel must therefore be moved in a direction at an angle to the vertical as shown by the arrows in FIGS. 8 and 9 so that the tongue 62 comes to slide in the groove 60. To facilitate the insertion of the bar 46 in the cavity 44, in accordance with one particular embodiment the cavity 44 has a transverse dimension between its edges 54, 56 greater than the transverse dimension of the bar 46 at the level of the attachment lower face 63 configured to come into contact with the aircraft. An empty space therefore remains to the rear of the bar when installed in the cavity: this empty space facilitates placing the panel on the sill, in particular at the level of the cavity or cavities. In accordance with the particular embodiment illustrated in FIGS. 8 and 9, the cross section of the bar 46 is of rectangular trapezoid shape, the longer base forming, with the side that forms a non-right angle with the latter, the tongue 62. The cross section of the cavity 44 has a shape very close to that of a parallelogram. The difference between these two geometric shapes creates the aforementioned empty space in the cavity to the rear of the bar, facilitating its introduction into the interior of the panel. The attachment lower face 63 of the bar or bars 46 is flush with the attachment face 42 of the panel. The thickness of the bar or bars 46 is such that they do not project beyond the attachment face 42.

In addition to protecting the door sill 4 by covering it, the panel 26 offers other draining, non-slip functions as well as a decorative function: it is a multifunctional panel as well as being easily and rapidly interchangeable.

Figure 10:
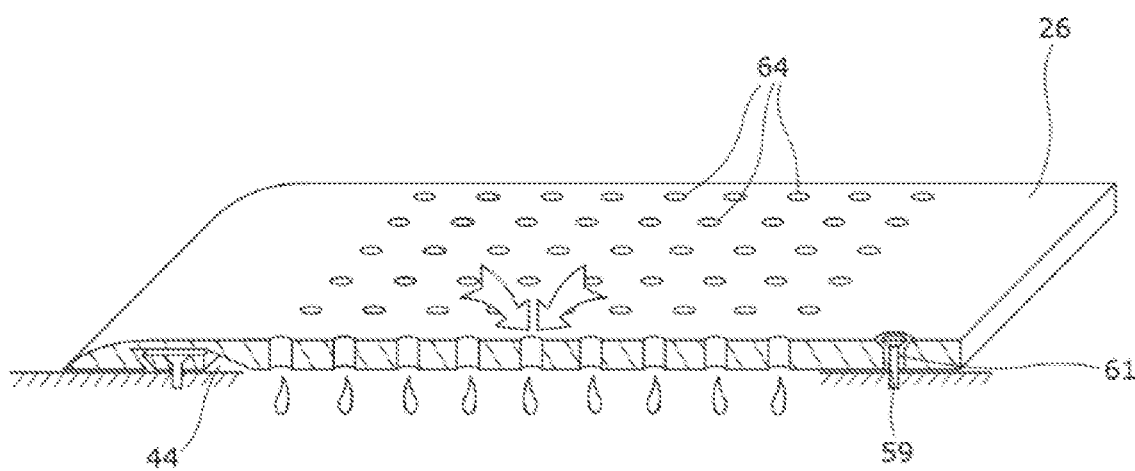
FIG. 10 is a schematic and simplified perspective view of one embodiment of a protection system panel in accordance with the present invention provided with drainage holes.
Figure 11A:
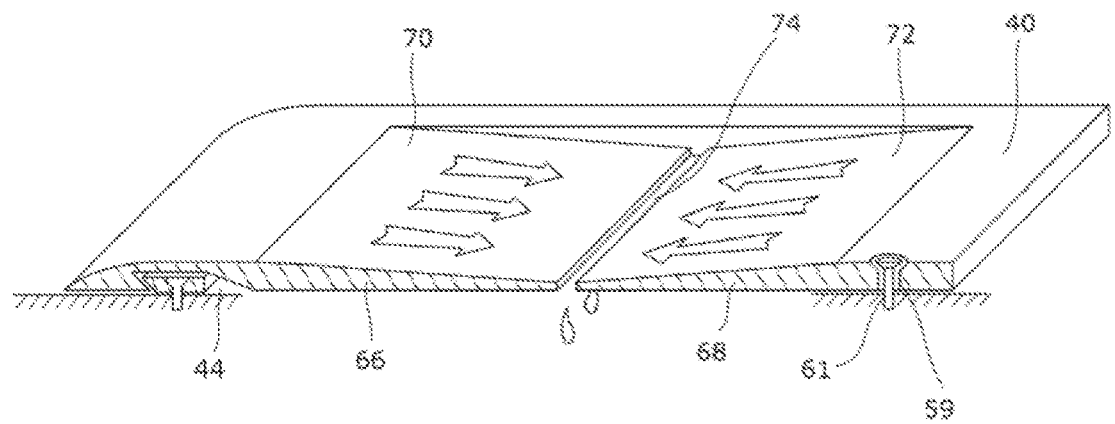
FIG. 11a is a schematic and simplified perspective view of one embodiment of a protection system panel in accordance with the present invention provided with surfaces sloping toward a gutter.
Figure 11B:
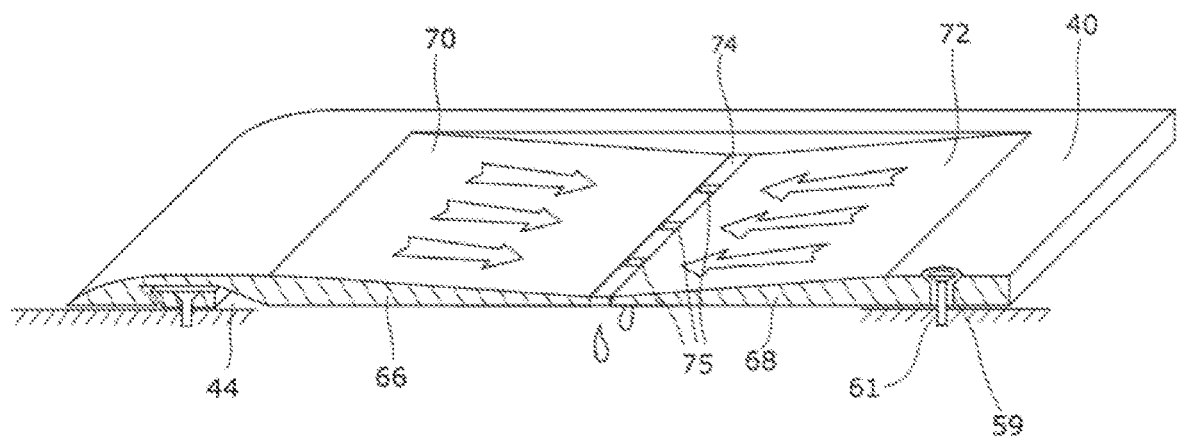
FIG. 11b is a schematic and simplified perspective view of one embodiment of a protection system panel in accordance with the present invention provided with surfaces sloping toward a gutter with through-windows.

FIGS. 10 and 11a, 11b show two possible panel embodiments enabling the drainage function to be assured. In FIG. 10, holes 64 are provided in the panel 26. The holes 64 pass through the thickness of the panel from the step face 40 to the attachment face 42. Thus, condensation coming from the cabin or rainwater coming from the exterior environment or water coming from any other source found on the panel 26 flows through the holes 64 onto the drainage panel 14 provided with means for guiding it to an outlet, such as the aforementioned plugholes 13, for example. The holes 64 may be distributed in a regular manner but may also be distributed in an irregular manner, for example to give an aesthetic effect. In the embodiment illustrated the holes 64 are disposed in rows parallel to one another over a part of the panel between the cavity or cavities 44 and the orifice or orifices 59. The arrows represent the movement of water that flows through the holes 64 to fall by gravity onto the drainage panel. In FIGS. 11a and 11b is represented another way of assuring drainage by gravity by imparting to at least a part of the step face 40 a shallow slope conveying the water to one or more holes or even one or more gutters 74 passing through it. In order to preserve the solidity of the panel, the gutter or gutters may pass through it in a discontinuous manner over their length, forming flow windows 75 through it illustrated in FIG. 11b. Numerous shapes are possible, like a single sloping plane surface or a funnel or other surface. In the embodiment illustrated in FIGS. 11a and 11b two contiguous parts 66, 68 of the panel 26 have surfaces 70, 72 at the level of the sloping step face 40 inclined downward, one toward the other, to join at the level of a gutter 74. The surfaces 70, 72 form a V. In the same manner as before, the gutter 74 enables water to be guided to the drainage panel, enabling its evacuation.

The panel 26 also has a non-slip function over all or a part of the step face 40 by virtue of having an appropriate surface state, because of the material used for the whole or a part of the panel or through adding a special coating or through a combination of the two. It is, for example, possible to provide a granular paint finish or three-dimensional patterns in relief produced by any means. It is equally possible to provide a coating using a material offering adhesion properties such as an elastomer. FIG. 7 shows the surface of the step face 40 laser etched to offer a rough and therefore non-skid wall. In accordance with another possible form, the surface has at least one zone offering a non-skid property and at least one smooth zone, for example two zones on the longitudinal sides of the panel so that any marking produced in these smooth zones is more legible.

The step face 40 of the panel may be provided with patterns in absolutely any way. These may be decorative patterns but also advertising or information or other patterns. The step face may be used, for example, to show the logo of the airline or evacuation instructions. The panel being easily and rapidly interchangeable, the visual appearance or the marking can be changed from one flight to another. Any obligatory marking produced on the sill 4 is reproduced in the same manner on the panel 26 if it conceals them by covering them, such as, for example, that concerning the evacuation slide.

Figure 12:
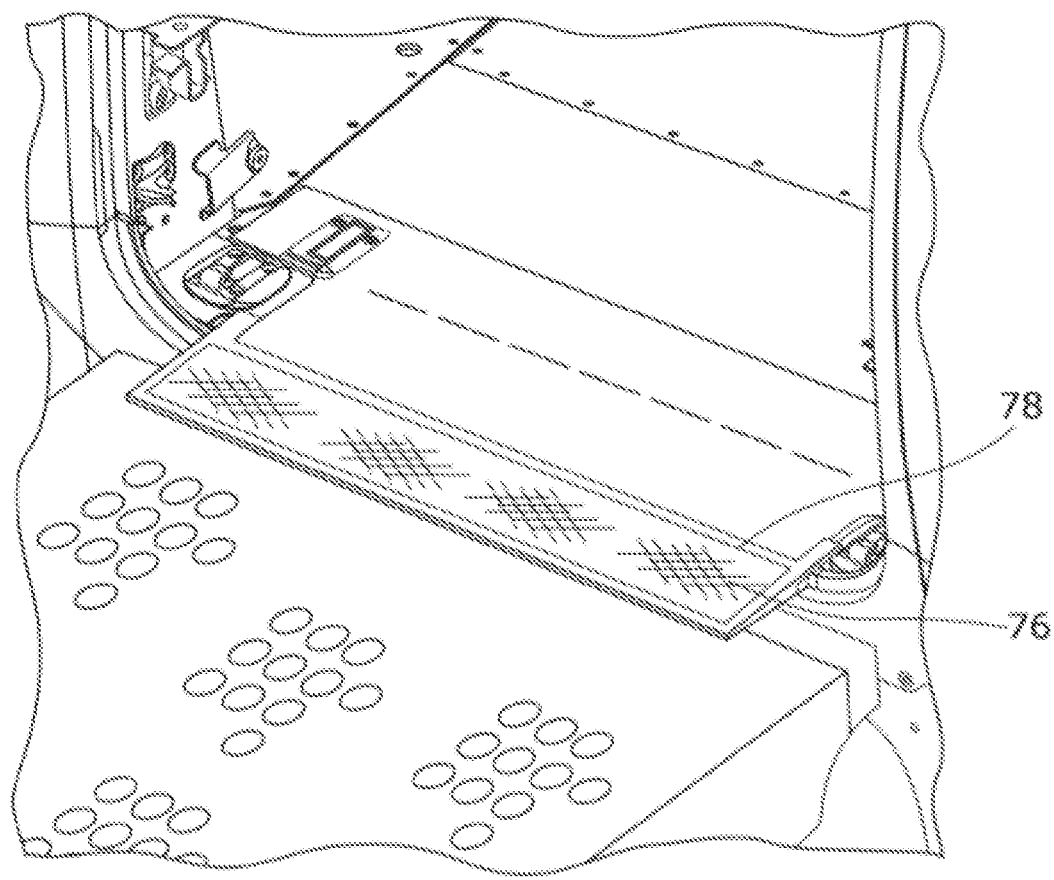
FIG. 12 is a perspective view of a protection system in accordance with the present invention installed on an aircraft door sill provided with an access ramp.

In accordance with one particular embodiment the panel 26 integrates a heating device. In this case there may equally be provided a thin layer of adhesive material such as polyurethane on a part of the attachment face 42 to protect the heated panel from corrosion and vibrations. The panel may also, as shown in FIG. 12, include fixing hooks or any other system enabling an access ramp 76 to be joined to the panel. The longitudinal interior edge 78 of the access ramp is contiguous with the exterior longitudinal edge 32 of the panel.

Figure 13A:
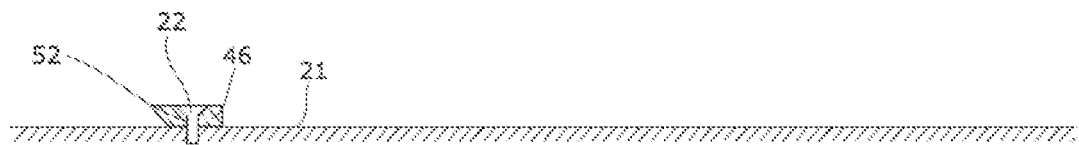
FIG. 13a shows, in a schematic and simplified cross section from the side of a door sill, a first step of the method for installation of the protection system in accordance with the present invention consisting in fixing one or more bars to the sill.
Figure 13B:
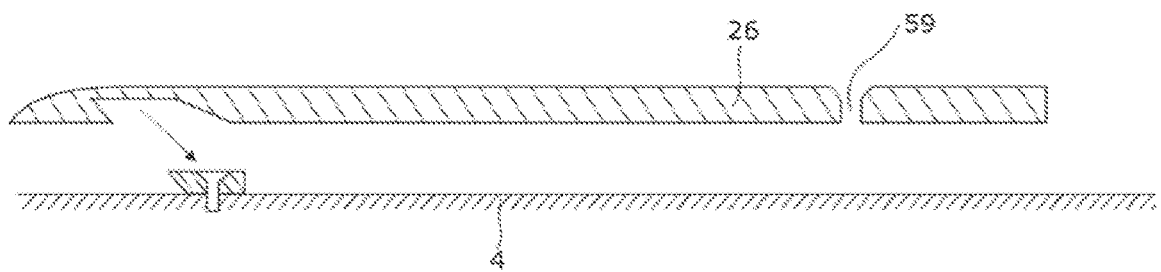
FIG. 13b represents, in the same view as FIG. 13a, a second step of the method for installation of the protection system in accordance with the present invention consisting in depositing the panel on the sill.
Figure 13C:
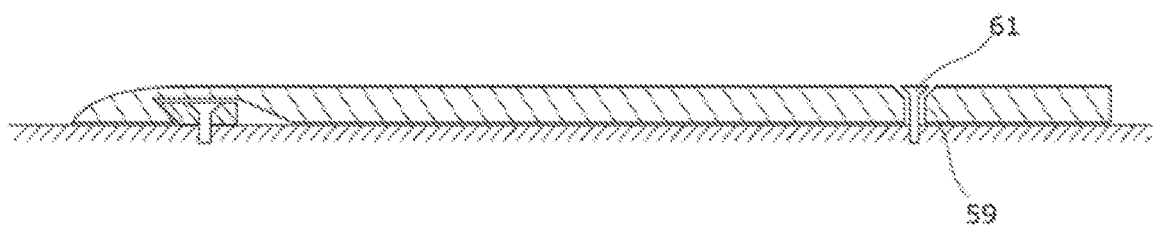
FIG. 13c shows, in the same views as FIGS. 13a and 13b, a third step of the method for installation of the protection system in accordance with the present invention consisting in fixing the panel to the sill.

FIGS. 13a to 13c, 14 represent the method of installing the panel 26. As FIG. 13a shows, the first step comprises forming abutments at the level of the sill. To this end, the bar or bars 46 is or are fixed to the sill 4. As seen above, in order not to have to form holes in the floor, the present invention uses those formed for the screws 22 for fixing the sill bar 12. The sill bar 12 is removed. The panel 26 serves as a sill bar. The bar or bars 46 is or are fixed to the sill with the aid of screws introduced into the orifices 52 and the threaded orifices provided for the screws 22 without having to form orifices specifically for fixing the bar or bars 46. The bar or bars project relative to the surface of the floor 21. As FIG. 13b shows, the panel 26 is then placed on the sill 4 starting from an upper and rear position relative to the bar or bars 46 by imparting to it a movement at a certain angle (i.e., not vertical) to enable the panel to be placed easily on the sill while introducing the tongue of the bar or bars into the groove or grooves 60 of the panel to immobilize it in translation. FIG. 13c shows the final step, which comprises introducing a screw 61 into the opening or openings 59 of the panel to fix it after it has been immobilized in translation by the bar or bars 46. The panel can thus be installed on the door sill and removed easily and rapidly by the reverse process.

Figure 14:
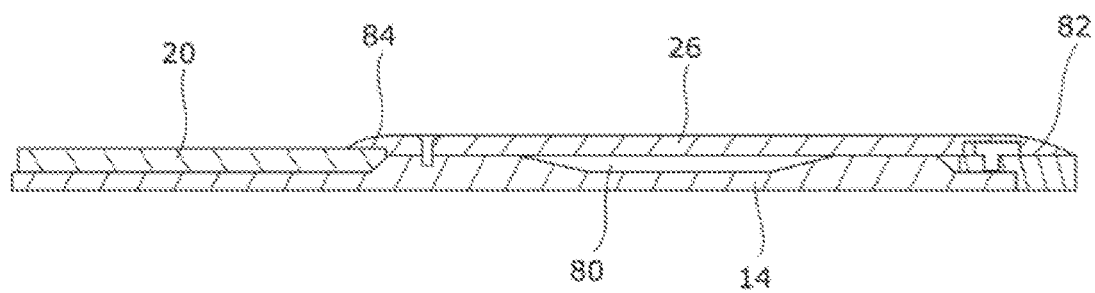
FIG. 14 is a schematic and simplified cross section from the side of a hollow drainage panel door sill on which a protection system in accordance with the present invention is installed.

FIG. 14 represents the panel 26 installed on the door sill. It covers the drainage panel 14, replaces the sill bar 12 and adjoins the covered floor 20. FIG. 14 shows that the drainage panel has a hollow 80 under the panel 26. Water therefore falls under gravity into the hollow, in which known classic evacuation systems are provided. FIG. 14 equally shows that the two end portions 82, 84 of each transverse side of the panel in the vicinity of the edges 32 and 34 are of decreasing thickness to enable a gently sloping rounded edge to be offered, preventing any clumsy lip the foot of a person could strike and protecting the seal and the (carpet or other) material covering the floor.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising at least one door, comprising a system for protection of at least one sill of the door, the system comprising:
   a rigid panel with shape and dimensions configured to cover and to protect the sill at least partially, having
      an attachment face oriented toward the sill of the aircraft and configured to come to rest on the sill, and
      a step face oriented in a direction away from the attachment face,
   the rigid panel comprising
      on one transverse side, at least one cavity forming a housing opening into the attachment face and,
      on the other side, means for removably fixing the rigid panel to the sill, and
      at least one bar fixed to the sill independently from the rigid panel, the at least one bar having a shape to fit within the cavity and nested therein, the at least one bar having an external wall abutting against an internal wall of the cavity to immobilize the rigid panel against movement in translation parallel to said sill.

2. The aircraft as claimed in claim 1, wherein the cavity includes a groove into which comes to be inserted a tongue provided on the bar.

3. The aircraft as claimed in claim 1, wherein the means for fixing the rigid panel to the sill comprises at least one screw inserted in and screwed into at least one threaded through-opening provided in the rigid panel.

4. The aircraft as claimed in claim 1, wherein the at least one bar comprises at least one threaded orifice to enable fixing thereof by screwing to the sill.

5. The aircraft as claimed in claim 1, wherein the rigid panel comprises drainage holes.

6. The aircraft as claimed in claim 1, wherein the step face has at least one sloping surface leading to at least one hole or to at least one gutter passing through the sloping surface in a continuous manner.

7. The aircraft as claimed in claim 1, wherein the step face has at least one sloping surface leading to at least one hole or to at least one gutter passing through the sloping surface in a discontinuous manner.

8. The aircraft as claimed in claim 1, wherein the rigid panel covers at least partly a drainage panel of the sill and is substituted for a conventional sill bar.

9. The aircraft as claimed in claim 1, wherein the step face is at least partially non-skid.

10. The aircraft as claimed in claim 1, wherein the step face of the rigid panel has a distinctive marking.

11. A method for installation of a protection system in an aircraft as claimed in claim 1, comprising the following steps:
   fixing the at least one bar to the door sill;
   depositing the rigid panel on the sill with the at least one bar inserted in the corresponding at least one cavity; and
   fixing the rigid panel to the sill with the removable fixing means.

12. The method as claimed in claim 11 of installing the protection system wherein the at least one bar is screwed to the sill using existing fixing holes.

\* \* \* \* \*